US005124742A

United States Patent [19]

Yoshikawa

[11] Patent Number: 5,124,742

[45] Date of Patent: Jun. 23, 1992

[54] PHOTOFINISHING METHOD AND RECEPTION APPARATUS FOR PHOTOFINISHING ORDER

[75] Inventor: Sumio Yoshikawa, Kanagawa, Japan

[73] Assignee: Fuji Photo Film Co., Ltd., Kanagawa, Japan

[21] Appl. No.: 758,152

[22] Filed: Sep. 12, 1991

[30] Foreign Application Priority Data

Sep. 14, 1990 [JP] Japan .................. 2-245831

[51] Int. Cl.[5] .................. G03B 27/32; G03B 27/52

[52] U.S. Cl. .................. 355/27; 355/38; 355/41; 355/68; 355/77

[58] Field of Search .................. 355/27, 28, 40, 41, 355/38, 68, 77, 50

[56] References Cited

U.S. PATENT DOCUMENTS

| | | | |
|---|---|---|---|
| 4,417,811 | 11/1983 | Hamer | 355/77 |
| 4,441,807 | 4/1984 | Bartz | 355/68 X |
| 4,912,502 | 3/1990 | Kanji et al. | 355/38 X |
| 4,937,617 | 6/1990 | Kito | 355/41 |
| 4,951,086 | 8/1990 | Hicks | 355/41 |
| 4,965,628 | 10/1990 | Olliver et al. | 355/41 |
| 5,032,707 | 7/1991 | Gudmundson et al. | 355/40 X |

*Primary Examiner*—Richard A. Wintercorn

*Attorney, Agent, or Firm*—Sughrue, Mion, Zinn, Macpeak & Seas

[57] ABSTRACT

Data relating to a customer's order for photofinishing are written on a mark sheet. The mark sheet is optically read in a photo-lab, thereby to record the customer's order data in a transparent magnetic recording layer of the photographic film to be processed. The photographic film is sorted with reference to the data read from the mark sheet and, thereafter, is processed according to the customer's order based on the data read therefrom by an appropriate processing apparatus.

13 Claims, 5 Drawing Sheets

PHOTOFINISHING METHOD AND RECEPTION APPARATUS FOR PHOTOFINISHING ORDER

BACKGROUND OF THE INVENTION

The present invention relates to a method of, and apparatus for, receiving and transacting a customer's order for photofinishing.

Conventionally, exposed photographic films such as negative films are forwarded to agencies mediating the customer's orders for photofinishing, wherein each film is packed in a prescribed customer's order envelope after writing necessary information, such as the name of the customer and the content of the order, on a predetermined portion of the envelope. Then, the envelopes containing the photographic films are forwarded to a photofinishing laboratory (hereinafter simply referred to as a "photo-lab"). In the photolab, the envelopes are manually sorted according to the content of the order written thereon.

Because of such a manual transaction of print orders, a misreading of the written information and thus a mistake in sorting of the envelopes have sometimes occurred.

The developed films are conventionally cut into pieces so as to be inserted in film sheaths, and the film sheaths are returned to the customers. But, recently, film cassettes have been suggested wherein a cassette, from which an exposed film has been pulled out for development, is used to accommodate a developed film, e.g., the same film as previously contained, in the form of a roll. When making extra prints, such a film cassette containing a developed film is forwarded to a photo-lab, in the same way as for developing and printing.

However, because the appearance of film cassettes containing developed film is not distinguishable from cassettes containing exposed but undeveloped film, it is troublesome to sort out films intended for extra printing from those intended for developing and printing. If a film intended for extra printing is mistakenly subjected to developing and printing, because the content of the customer's order is usually not confirmed until all the processes are completed, unnecessary prints will be made. If, in this case, the customer requests that a plurality of extra prints be made from an image frame, it is necessary to perform printing once more so as to obtain the desired prints.

In this way, conventional film sorting or transacting methods in photo-labs are very labor intensive and inefficient.

SUMMARY OF THE INVENTION

In view of the foregoing, an object of the present invention is to provide a print order reception method and an apparatus therefor by which it is possible to sort films easily and reliably according to the content of the order, and designate the frames to be printed and the number of prints to be made therefrom, according to the customer's order.

To achieve the above and other objects, a photofinishing method of the present invention comprises the steps of entering data relating to the content of photofinishing to be performed on a mark sheet, reading the data optically from the mark sheet; recording the data in a recording medium, such as a magnetic recording layer of the photographic film and which is disposed on the opposite side to the photosensitive emulsion layer thereof, or an IC memory disposed in a cassette containing said photographic film; reading the data from the recording medium in a processing apparatus such as a printer-processor, or the like, thereby to process the photographic film according to the read data.

The data include, for example, an ID code, developing-printing order data, extra-printing order data, developing order data, data on the number of prints to be made from an image frame, data on the frame number to be printed, print size data, and print surface type data.

According to a preferred embodiment of the present invention, the content of photofinishing is displayed based on the data read from the mark sheet, so as to sort the photographic film according to the displayed content, before processing.

A reception apparatus for carrying out the photofinishing order reception method of the present invention comprises an optical reading device for reading the data from the mark sheet, and a recording device for recording the data on the recording medium.

According to the present invention, because the content of the customer's order is entered as mechanically readable data on a mark sheet along with an ID number, it is unnecessary to read out manually the content of the customer's order written in a predetermined portion of a customer's order envelope for subjecting a photographic film to a desired processing. Therefore, the photographic films can be reliably sorted according to the content of the desired processing, so that time wasting re-printing because of a mistake in sorting is certainly prevented. Furthermore, because the mark sheet system does not require specific keyboard operation, anyone can easily enter the customer's order data. The present invention also facilitates the efficiency of extra-printing because the designation of the image frame to be extra-printed and the number of extra prints to be made is automated using a mark sheet and a reception apparatus.

BRIEF DESCRIPTION OF THE DRAWINGS

The above and other objects and advantages of the present invention will become more apparent from the following detailed description when read in conjunction with the accompanying drawings, in which.

DETAILED DESCRIPTION OF THE PREFERRED EMBODIMENTS

Figure 1:
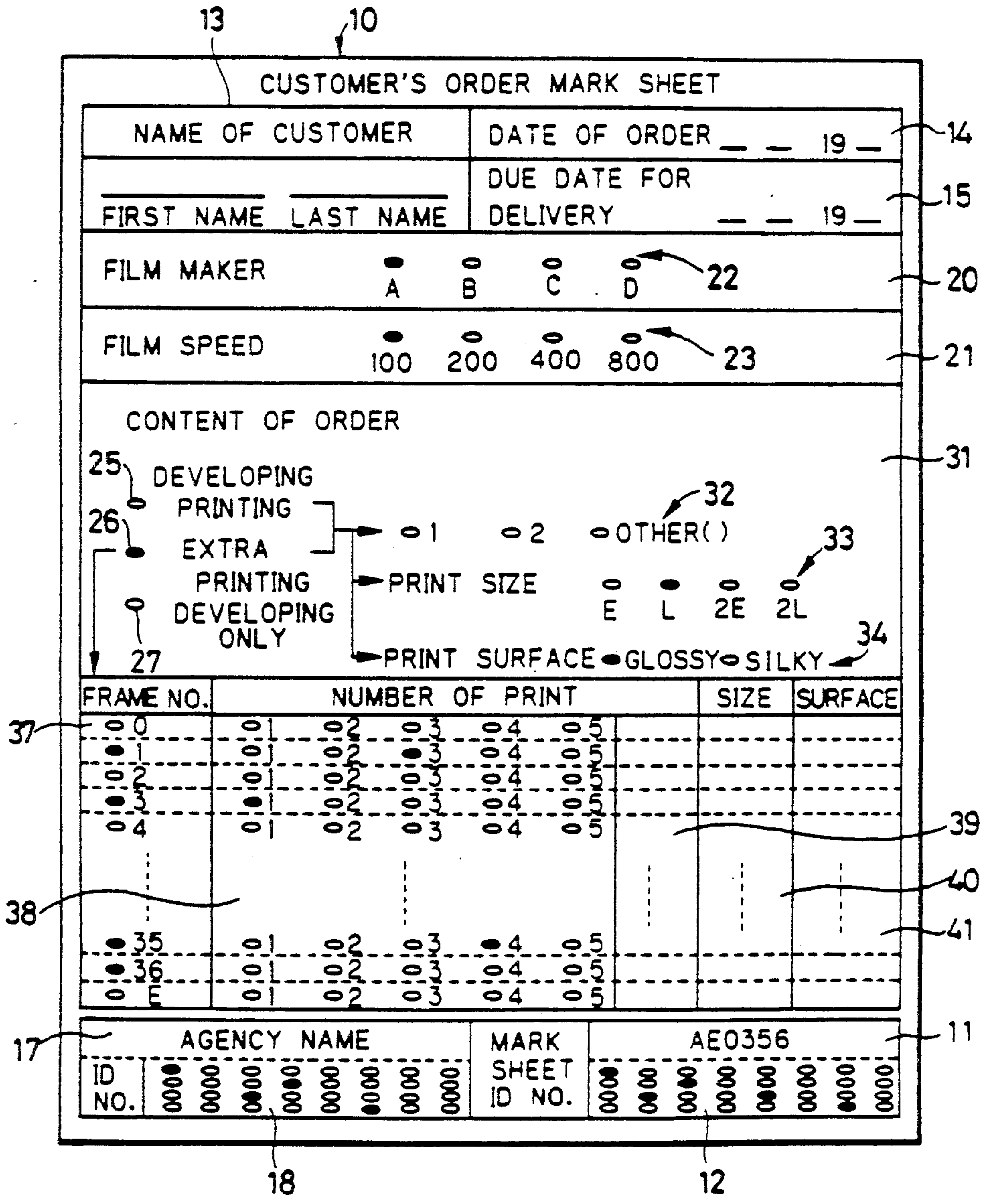
FIG. 1 is a plane view showing an example of a mark sheet used in the invention.

In a print order reception step, when a photofinishing agency receives a photographic film to be printed, which is wound in a cassette, for instance, the content of a customer's order, such as whether developing and printing or extra printing is requested, is written on a customer's order mark sheet 10 by darkening corresponding marking portions or ovals of the mark sheet 10 with a pencil, as shown in FIG. 1.

The mark sheet 10 is printed with an ID number symbol 11 for identifying the mark sheet 10, and a corresponding ID number mark 12. The mark sheet 10 also has a customer's name entry section 13, an order date entry section 14, and an entry section 15 for entering the due date for delivery of finished prints. The name of an agency can be written in an agency name entry section 17 and a corresponding agency ID number mark 18. The marks 12 and 18 may be replaced by bar codes.

The film maker and the film speed are entered in a film maker entry section 20 and a film speed entry section 21 by darkening a corresponding one of the predetermined marks or ovals 22 and 23, respectively.

A print order content entry section 31 has a developing and printing order mark segment 25, an extra print order mark segment 26, and a developing order mark segment 27 for requesting development of the film only. Mark segment 32 is used to select the number of prints to be made from each image frame to be printed when developing and printing or extra printing is ordered. If, at that time, the number of prints of each frame is more than two, a mark segment "other" should be darkened, and the requested number is written in the associated parentheses. Mark segments 33 and 34 are used to select the size of prints and the type of print surface, respectively.

When extra printing is ordered, the image frames to be extra printed and the number of prints to be made therefrom are entered by darkening corresponding mark segments of a frame number column 37 and a print number column 38, respectively. If, at that time, the print number to be made from an image frame is more than five, the requested number should be designated by writing it in the corresponding rank of column 39. Specific designation of size or print surface type of an extra print can be made using entry sections 39, 40 and 41.

Figure 2:
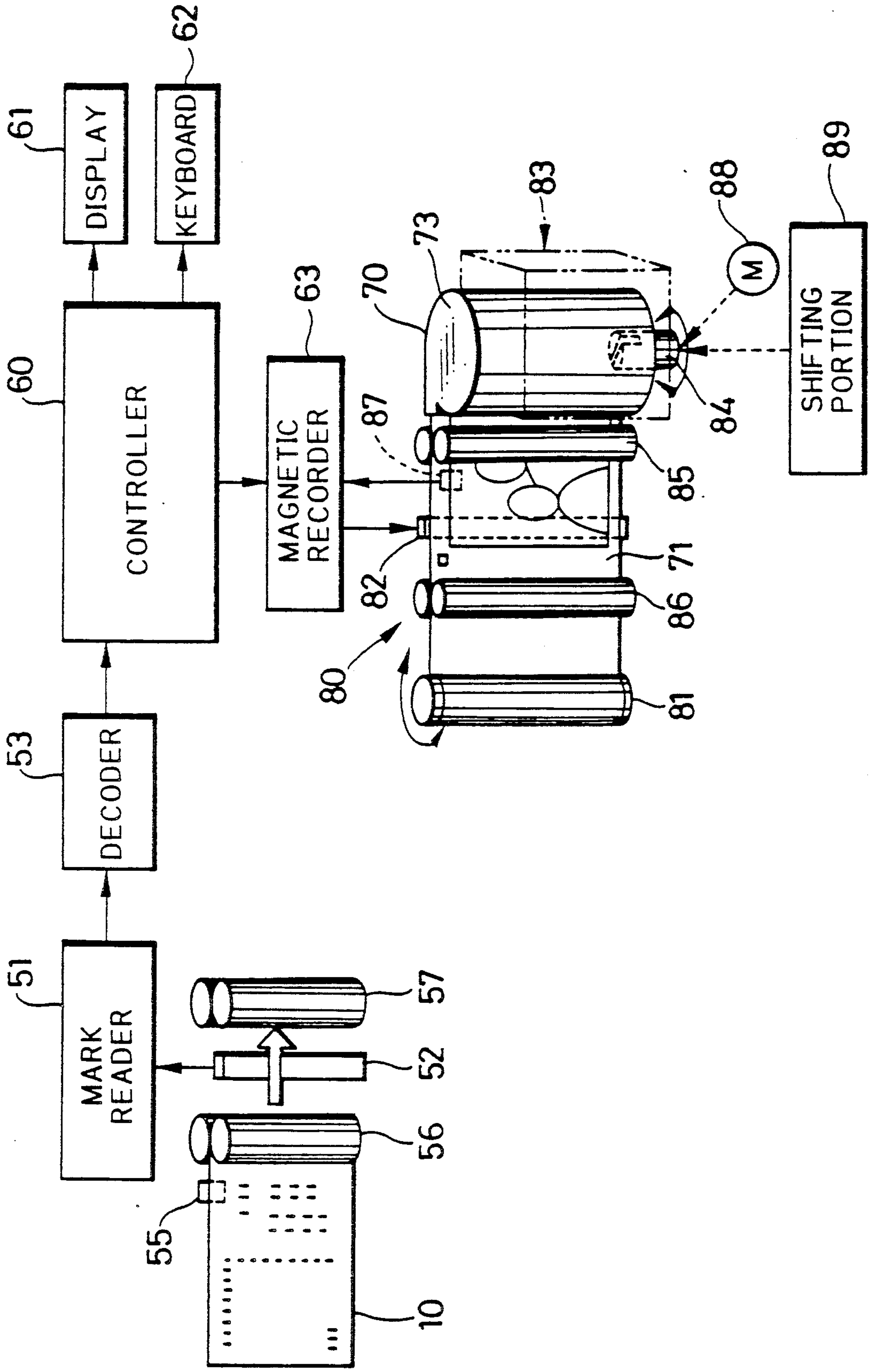
FIG. 2 schematically shows a reception apparatus embodying the present invention.
Figure 3:
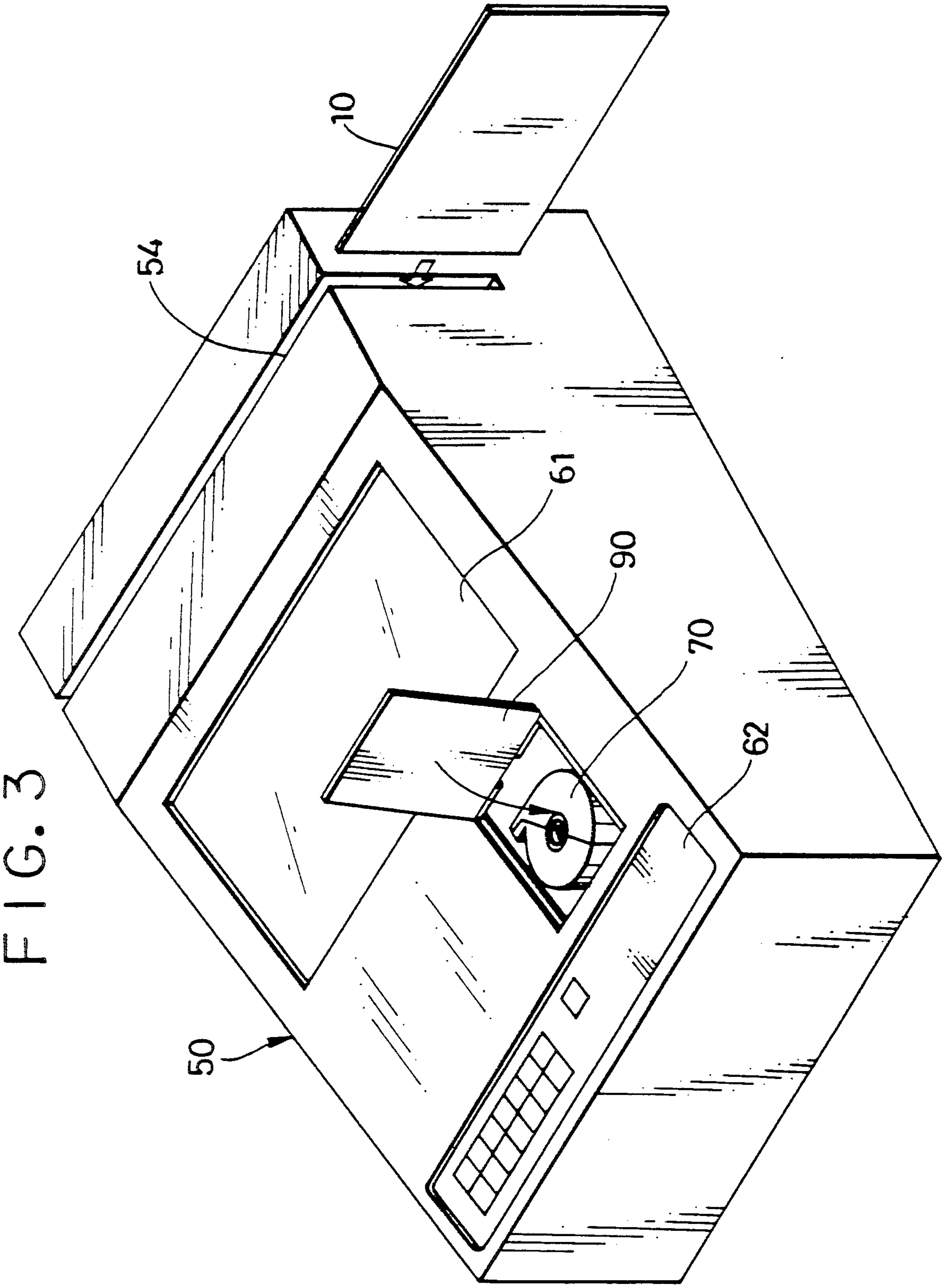
FIG. 3 is a perspective view of the reception apparatus.

As shown in FIGS. 2 and 3, the content entered in a mark sheet 10 is read out by a mark reader 51 of a reception apparatus 50. The mark reader 51 includes an optical scanner 52 for scanning the marks on the mark sheet 10, which is disposed within a mark sheet guide slit 54 of the reception apparatus 50. Signals detected by the optical scanner 52 are sent to a decoder 53. In the mark sheet guide slit 54, there are also disposed a sheet sensor 55 for detecting that a mark sheet 10 is placed in the guide slit 54, and two pairs of sheet transporting rollers 56 and 57 which are activated upon detection of the mark sheet 10 by the sheet sensor 55. Transporting speed signals which are indicative of the transporting speed of the rollers 56 and 57 are also sent to the decoder 53. The decoder 53 converts the signals from the optical scanner 52 into print order signals and ID number signals, and sends them to a controller 60. The controller 60 comprises a microcomputer which controls respective portions of the reception apparatus 50 in a predetermined sequence, in response to commands entered by a keyboard 62, and displays the content of a customer's order, which is entered in the mark sheet 10, on a display panel 61 (see FIG. 3). The controller 60 further controls a magnetic recorder 63 so as to record the content of a customer's order on a magnetic recording layer of a corresponding photographic film 71 pulled out from a film cassette 70 placed in the reception apparatus 50.

Figure 4:
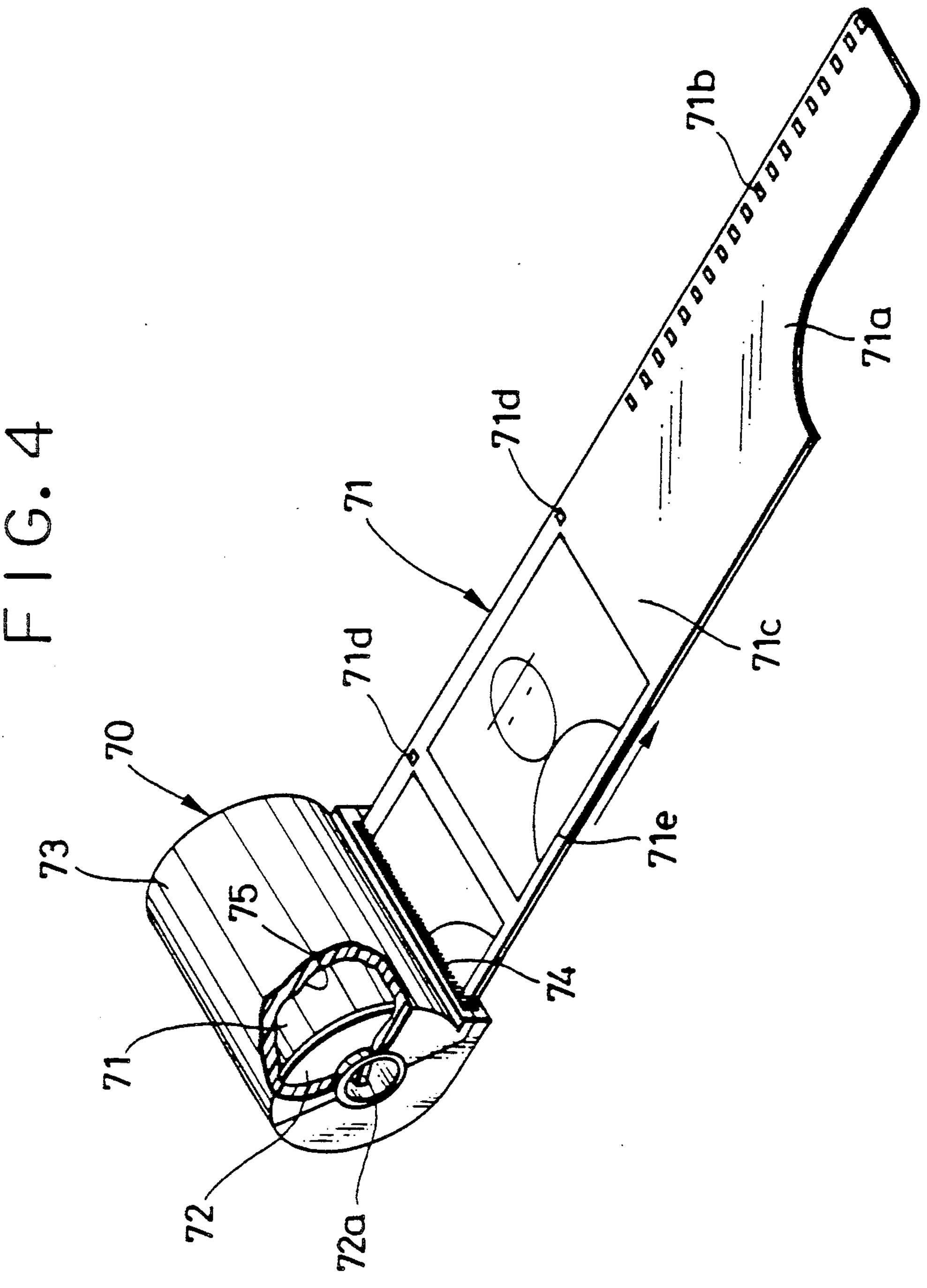
FIG. 4 is a perspective view of a photographic film cassette applicable to the reception apparatus.

As shown in FIG. 4, an exposed or developed photographic film 71 is wound on a spool 72 in the film cassette 70, and is received in a cassette housing 73. The film cassette 70 is constructed such that a film leader 71*a* can be let out from the film cassette 70 through a film gate 74 of the cassette housing 73 by rotating the spool 72 in the film unwinding direction that is reversed to the direction to rewind the film into the cassette housing 73. Inner room 75 of the film housing 73 has a diameter that is approximately equal to or slightly larger than the maximum diameter of a film roll that is made when the entire length of the film 71 has been wound up on the spool 72. When the spool 72 is rotated in the unwinding direction, the rotational movement is transported to the film leader 71*a*, so that the film leader 71*a* is let out through the film gate 74.

The film leader 71*a* has a cut-out in one side edge, as is well-known in the art, so as to reduce the resistance of the film leader 71*a* being let out. The film leader 71*a* is further formed with perforations 71*b* for initial advancing of the film 71. In image recording portion 71*c* of the film 71, a perforation 71*d* is formed in association to each image frame 71*e*, so that each image frame 71*e* is located in an exposure station of a camera or a printer with reference to the perforations 71*d*. The perforations 71*d* may be detected mechanically or optically. Furthermore, the film 71 is provided with a transparent magnetic recording layer on the surface opposite to the surface provided with photosensitive emulsion. On this magnetic recording layer, various data such as film data, photographic data, print order data, and the like, are magnetically recorded during production of the film, photographing, the reception process and so forth.

The photographic film 71 in the film cassette 70 may be subjected to developing and/or printing without being separated from the cassette housing 73. Thereafter, the developed photographic film 71 is rewound into the cassette housing 73 and is returned to the customer. It is of course possible to separate the film 71 from the housing 73 so as to develop it in a conventional manner. Also, in this case, the developed film 71 may again be rewound into the housing 73 using an appropriate device, so that the customer can receive the developed film 71 contained in the film cassette 70.

In the reception process, the photographic film 71 is drawn out from the cassette housing 73 and taken-up on the take-up shaft 81 in a film draw out portion 80 of the reception apparatus 50, as shown in FIG. 2, wherein a magnetic recording head 82 of the magnetic recorder 63 is disposed between a cassette holder 83 and the take-up shaft 81, so as to record print order data on the magnetic recording layer of the film 71 while being drawn out.

The film draw out portion 80 comprises the takeup shaft 81, the cassette holder 83, a spool drive shaft 84, two pairs of film drawing rollers 85 and 86, and a film leader sensor 87. The cassette holder 83 is constructed such that the cassette housing 73 held therein will not be rotated even when the spool 72 is rotated for advancing the film leader 71*a* out of the film housing 73. The spool drive shaft 84 is driven by a motor 88 so as to rotate the spool 72. The spool drive shaft 84 is further connected to a shifting portion 89 which moves the spool drive shaft 84 between an engage position at which one end of the shaft 84 is inserted in an engaging end 72*a* of the spool 72, and a discharge position upward from the engage position. When the spool drive shaft 84 is moved into the discharge position, the film cassette 70 is discharged upwards from the cassette holder 83.

The overall operation of the above-described embodiment will be described below.

A film cassette 70 containing a photographic film 71 to be developed and/or printed is placed in the cassette holder 83 disposed below a lid 90. Upon setting the film cassette 70 into position, the spool drive shaft 84 is engaged with the engaging end of the spool 72. After the lid 90 is closed to cover the film cassette 70 in a light-tight fashion, a mark sheet 10 having print order data marks thereon is slid into the sheet guide slit 54. Then, the sheet sensor 55 is turned on, so that the sheet transporting rollers 56 and 57 start rotating so as to transport the mark sheet 10 through the guide groove 54. During transporting of the mark sheet 10, the optical scanner 52 detects the respective marks. Mark detection signals from the optical scanner 52 are converted by the decoder 53 into processing signals which are sent to the controller 60.

The controller 60 activates the film draw out portion 80 to advance the film leader 71*a* out of the cassette housing 73 by rotating the spool driving shaft 84. When the film leader sensor 87 detects the film leader 71*a*, the spool driving shaft 84 is set in an idling status, and the film 71 is drawn by rotating the film drawing rollers 85 and 86. The magnetic recording head 82 records the content of the customer's order, which is read out from the mark sheet 10, onto the film 71. At the same time, the content is displayed on the display 61. For example, when the customer requests developing and printing, print order data such as developing-printing order data, the number of prints to be made from each image frame, the size of the print, the type of print surface, and the like are recorded on the magnetic recording layer of an undeveloped exposed film. When extra printing is requested, extra print order data such as the frame numbers to be extra-printed, the respective numbers of extra prints, the size and the surface type of each extra print are recorded on the magnetic recording layer of a developed film. If the customer requests developing only, then print data indicating this desire is recorded.

After magnetic recording, the film 71 is rewound on the spool 72 of the film cassette 70, which is then discharged from the cassette holder 83. Thereafter, the operator sorts the film cassettes 70 according to the content of processing to be done. The sorted film cassettes 70 are respectively placed in corresponding processing apparatuses such as a film processor and a printer-processor. The processing apparatuses should be provided with data reading portions for reading data recorded on the magnetic recording layer of films, so that those apparatuses can perform processing in accordance with the read data.

For example, a film having order data for developing only is processed in a film processor. A film having developing-printing order data is placed in a film processor and, thereafter, in a printer-processor. Printing is performed on the basis of the data read out from films by the data reading portion, that is, the data recorded on the films when the film is produced, when each photograph is recorded on the film, and/or when the film is received by the photolab. In particular, print-exposure correction is performed depending on light source data that is recorded during photographing, or a print-exposure amount is decided that emphasizes the human subject when portrait data is recorded. Furthermore, the size, surface type of photographic paper and the number of prints are changed according to the print size data, print surface type data, print number data and so forth.

Films having extra print order data are placed in a printer-processor wherein a desired number of extra prints are made from each designated image frame. Also, in these cases, the size and surface type of photographic paper are changed according to the print size data and the print surface type data, respectively. In extra printing, print-exposure correction amounts used in developing and printing are read out with reference to film identifying numbers, so as to make extra prints under the same condition as the original prints made in the developing-printing process.

Before starting the processing in the respective processing apparatuses, it is confirmed whether the print order data recorded on the magnetic recording layer of the film placed therein correspond to the content of processing that is intended to be done. If not, an audio alarm, or the like, is generated to indicate the failure to the operator. In this way, the content of the order is automatically compared with the content of processing before the apparatus starts processing, so that erroneous printing is prevented.

Although film cassettes are manually sorted with reference to the customer's order content displayed on the display 61 in the above embodiment, it is possible to sort automatically the film cassettes into a plurality of cassette saucers according to the content of designated processing, by providing the reception apparatus with such cassette saucers and a cassette discharging mechanism, wherein the cassette discharging mechanism is controlled depending on the content of designated processing indicated by the recorded data, thereby to discharge individual cassettes from the cassette holder into the corresponding cassette saucer.

Figure 5:
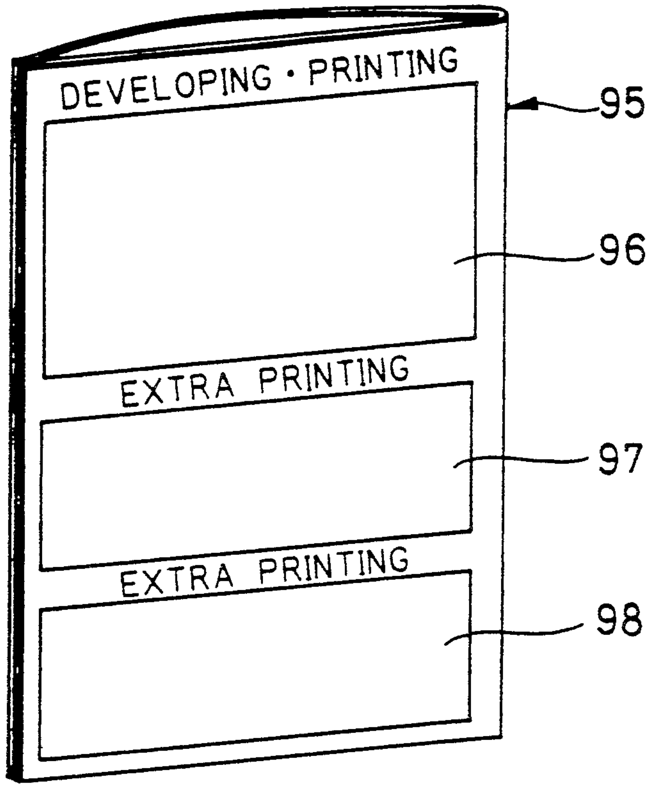
FIG. 5 shows a customer's order envelope having the mark sheet portions.

Furthermore, in place of the above described separate mark sheet 10, it is possible to provide a customer's order envelope 95 with a mark sheet portion 96, as shown in FIG. 5. The mark sheet portion 96 may be printed on one side of the envelope 95. It is desirable to provide second and third mark sheet portions 97 and 98, so that extra printing can be ordered twice using the same envelope 96.

The mark sheet 10 which is marked by darkening the necessary marking segments, may be replaced by a mark sheet wherein numerals are entered in appropriate sections, and are scanned by an image area sensor, or the like, which can automatically discriminate the numerals based on the scanning signals.

The recording medium for recording print order data and so forth should not be limited to the above described transparent magnetic recording layer provided on the back surface of photographic film opposite to the photosensitive emulsion surface thereof. It is possible to provide a magnetic recording leader on one end of a film. It is also possible to incorporate an IC memory, or the like, in a film cassette, so as to store electrically print order data and so forth therein.

It will be understood that the present invention is not intended to be limited by the above described embodiments, but, on the contrary, various modifications of the present invention can be effected without departing from the spirit and scope of the appended claims.

What is claimed is:

1. A photofinishing method for performing developing, printing or extra printing according to a customer's order, comprising the steps of:

writing data on a mark sheet, said data relating to content of photofinishing to be performed on a photographic film;

reading said data optically from said mark sheet;

recording said data in a recording medium disposed in one of said photographic film and a cassette containing said photographic film;

reading said data from said recording medium during photofinishing; and photofinishing said photographic film according to said data read from said recording medium.

2. A photofinishing method as claimed in claim 1, wherein said data include an ID code, developing order data, developing-printing order data, extra-printing order data, data on the number of prints, and frame number data.

3. A photofinishing method as claimed in claim 2, wherein said data further include print size data and print surface type data.

4. A photofinishing method as claimed in claim 3, wherein said recording medium is a transparent magnetic recording layer disposed on one surface of said photographic film opposite to a photosensitive emulsion layer of said photographic film.

5. A photofinishing method as claimed in claim 4, further comprising the steps of:

drawing out said photographic film from said cassette during said recording of said data on said recording medium disposed in said photographic film; and rewinding said photographic film into said cassette, thereafter.

6. A photofinishing method as claimed in claim 5, further comprising the steps of:

drawing out said photographic film for processing; and rewinding said photographic film into said cassette, thereafter.

7. A photofinishing method as claimed in claim 5, wherein said recording medium is also recorded with film data, photographic data relating to respective image frames, and print-exposure correction data.

8. A photofinishing method as claimed in claim 1, further comprising the steps of:

displaying the content of photofinishing based on said data read from said mark sheets; and sorting said photographic film according to the displayed content before said photofinishing step.

9. A photofinishing method as claimed in claim 1, wherein said mark sheet is provided on one side of a prescribed envelope, in which said photographic film is enclosed.

10. A reception apparatus for use in photofinishing order reception comprising:

means for optically reading data relating to an ordered photofinishing, from a mark sheet; and means for recording said data on a recording medium disposed in one of a photographic film to be processed and a cassette containing said photographic film.

11. A reception apparatus as claimed in claim 10, wherein said recording means magnetically records said data on a transparent recording layer of said photographic film and which is disposed opposite to a photosensitive emulsion layer of said photographic film.

12. A reception apparatus as claimed in claim 11, further comprising a film cassette holder for holding said photographic film contained in said cassette, a film leader advancing mechanism for advancing a film leader portion of said photographic film out of said cassette, and a transporting mechanism for transporting said photographic film so as to be recorded with said data by said recording means.

13. A reception apparatus as claimed in claim 12, further comprising display means for displaying said data read from said mark sheet.

* * * * *